United States Patent [19]

Pfaendner et al.

[11] Patent Number: 5,496,920
[45] Date of Patent: Mar. 5, 1996

[54] INCREASING THE MOLECULAR WEIGHT OF POLYAMIDES

[75] Inventors: Rudolf Pfaendner, Rimbach/Odenwald; Kurt Hoffmann, Lautertal; Heinz Herbst, Lautertal-Reichenbach, all of Germany

[73] Assignee: Ciba-Geigy Corporation, Tarrytown, N.Y.

[21] Appl. No.: 250,133

[22] Filed: May 27, 1994

[30] Foreign Application Priority Data

Jun. 7, 1993 [CH] Switzerland .................. 1694/93

[51] Int. Cl.$^6$ .................. C08G 63/91; C08G 69/48
[52] U.S. Cl. .................. 528/487; 528/310; 528/322; 528/480; 528/492; 525/419; 525/420; 524/99; 524/115; 524/130
[58] Field of Search .................. 528/322, 310, 528/480, 487, 492; 525/420, 419; 524/99, 115, 130

[56] References Cited

U.S. PATENT DOCUMENTS

| | | |
|---|---|---|
| 4,912,175 | 3/1990 | Wheland et al. .................. 525/420 |
| 5,116,919 | 5/1992 | Buzinkai et al. .................. 525/420 |
| 5,142,000 | 8/1992 | Wheland .................. 525/420 |
| 5,250,619 | 10/1993 | Heinz et al. .................. 525/425 |

FOREIGN PATENT DOCUMENTS

| | | |
|---|---|---|
| 0353969 | 2/1990 | European Pat. Off. . |
| 0410230 | 1/1991 | European Pat. Off. . |
| 4224668 | 11/1993 | Germany . |
| WO9210526 | 6/1992 | WIPO . |

OTHER PUBLICATIONS

Webster's 7th New Collegiate Dictionary, G & C Merriam Company, Publishers, Springfield, Mass., 1970, p. 384.
S. Fakirov in Kunststoffe 74; (1984) 218–221.
R. E. Grützner, et al. Kunststoffe 82 (1992) pp. 284–288.

*Primary Examiner*—P. Hampton-Hightower
*Attorney, Agent, or Firm*—Michele A. Kovaleski

[57] ABSTRACT

An increase in the molecular weight of newly produced polyamides and recycled polyamide materials can be achieved by heating to above the melting point or glass transition point and adding of a bismaleimide and a sterically hindered hydroxyphenyl-alkyl-phosphonic acid ester or half-ester.

9 Claims, No Drawings

INCREASING THE MOLECULAR WEIGHT OF POLYAMIDES

BACKGROUND OF THE INVENTION

The invention relates to a process for increasing the molecular weight of polyamides and the polyamides obtainable by the process.

Polyamides are important thermoplastic materials from the group of industrial plastics of high strength, rigidity, hardness and heat deformation resistance. These mechanical and physical properties depend decisively on the molecular weight of the polymer. High-quality recycling of used polyamides and of production waste, for example from fibre production and the injection moulding sector, without an after-treatment is possible to only a limited extent because of reduced molecular weights.

Improvement in the material properties of used polyamides or polyamides which have been predamaged by heat or hydrolysis, the damage typically being accompanied by a reduction in molecular weight, is known in principle. Polyamides are accessible as polycondensation products, for example from post-condensation in the solid state (S. Fakirov, Kunststoffe 74 (1984), 218 and R. E. Grützner, A. Koine, Kunststoffe 82 (1992), 284. However, this method is protracted and furthermore reacts sensitively to impurities such as may be present in waste material.

The use of phosphoric acid or phosphorous or phosphonous acid as a catalyst has furthermore been proposed for solid phase condensation of polyamides in EP-0 410 230.

The object of the present invention was therefore development of a process which allows a substantial increase in the molecular weight of polyamides in a relatively short time.

Surprisingly, a substantial increase in the molecular weight of the polyamide is possible by melting the polyamide and by addition of a mixture of at least one bismaleimide and one sterically hindered hydroxyphenyl-alkyl-phosphonic acid ester or half-ester to the polyamide. This increase in molecular weight causes an improvement in the properties of the polyamides, in particular in the injection moulding sector and in recycled materials. An increase in molecular weight can be achieved with the aid of the process according to the invention on, in particular, polyamide recycled materials from collection of used industrial components of automobile and electrical applications.

DETAILED DESCRIPTION OF THE INVENTION

The invention thus relates to a process for increasing the molecular weight of polyamides, which comprises heating a polyamide, with the addition of a bismaleimide and a sterically hindered hydroxyphenyl-alkyl-phosphonic acid ester or half-ester, above the melting point (in the case of crystalline polyamide types) or the glass transition point (in the case of amorphous polyamide types) of the polyamide.

Polyamides, i.e. both newly produced polyamides and polyamide recycled materials, are to be understood as meaning aliphatic and aromatic polyamides or copolyamides which are derived from diamines and dicarboxylic acids and/or from aminocarboxylic acids or the corresponding lactams. Suitable polyamides are, for example: PA 6, PA 11, PA 12, PA 46, PA 66, PA 69, PA 610, PA 612, and also amorphous polyamides of the Trogamid PA 6-3-T and Gfilamid TR 55 type. Polyamides of the type mentioned are generally known and commercially obtainable.

The invention acquires particular importance for polyamide recycled materials, such as are obtained from production waste, useful material collections or by so-called obligatory returnables, for example in the automobile industry or in the electrical sector. The polyamide recycled materials here are damaged by heat and/or hydrolysis in a wide variety of ways. They can be, in principle, the polyamides already mentioned; however, because of the nature of the collection, mixtures of, for example, polyamide 6 and polyamide 6.6 can also be employed. These recycled materials furthermore can also comprise minor amounts of admixed plastics of different structure, for example styrene polymers (ABS, ASA) or polyesters, and also customary impurities, for example paint residues, traces of metals, fuel residues or also traces of water.

PA 6 and PA 6.6 or their mixtures and recycled materials based on these polyamides are preferably employed as the polyamides.

Bismaleimides (BMI) in the context of this invention can be represented by the following formula (I):

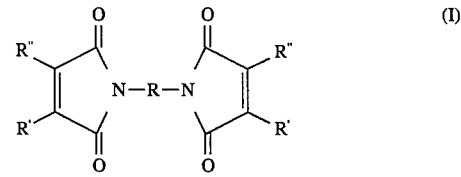

in which

R is an aliphatic, aromatic, cycloaliphatic or heterocyclic radical; and

R' and R" independently of one another are hydrogen, $C_1$–$C_4$alkyl, $C_1$–$C_6$alkoxy, phenyl or phenyloxy.

The aliphatic, aromatic, cycloaliphatic or heterocyclic radicals contain not more than 40 C atoms, they can be unsubstituted or substituted, and the radicals mentioned can also be interrupted by —O—, —S—, —$(CH_2)_{1-6}$—, —C(O)—, —P(O)($C_1$–$C_{18}$alkyl)— or —S($O_2$)— (which is the radical

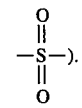

).

Examples of possible substituents are: $C_1$–$C_{18}$alkyl, $C_1$–$C_{18}$alkoxy, OH, phenyl and phenyloxy.

An aliphatic radical R is, for example, a $C_1$–$C_{18}$polymethylene radical which can be derived from alkyl radicals such as methyl, ethyl, n-propyl, n-butyl, sec-butyl, tert-butyl, n-hexyl, n-octyl, 2-ethyl-hexyl, n-nonyl, n-decyl, n-undecyl, n-dodecyl, n-tridecyl, n-tetradecyl, n-hexadecyl or n-octadecyl and other branched isomers.

An aromatic radical R is, for example, a radical having 6–40 C atoms, such as phenylene, biphenylene or naphthylene, or is phenylene or biphenylene radicals bonded by one of the groups such as —O—, —S—, —$(CH_2)_{1-6}$—, —C(O)—, —P(O)($C_1$–$C_{18}$alkyl)— or —S($O_2$)—.

A cycloaliphatic radical R is, for example, a radical having 5–10 C atoms, such as cyclopentylene, cyclohexylene or cyclooctylene.

A heterocyclic radical R is, for example, an N-containing 5- or 6-membered ring, such as peridylene, pyridazylene or pyrazolylene.

R is preferably an aromatic radical of one of the formulae:

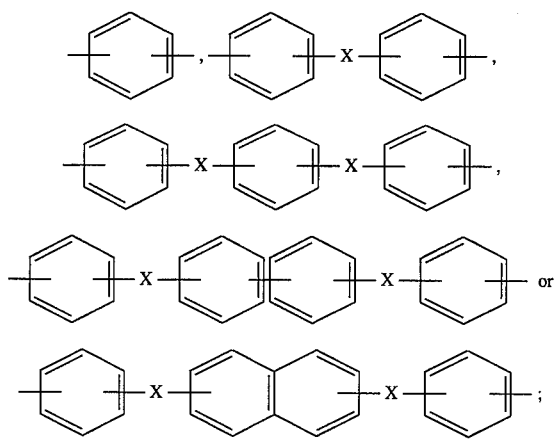

in which X is one of the radicals —CH$_2$—, —C(O)—, —P(O)(C$_1$–C$_{18}$alkyl)—, —S(O$_2$)—, —O— or —S—.

R' and R" preferably independently of one another are hydrogen or C$_1$–C$_4$alkyl, and, particularly preferably, R' is hydrogen and R" is hydrogen or methyl, and especially preferably R' and R" are hydrogen.

Especially preferred compounds are those of the formula

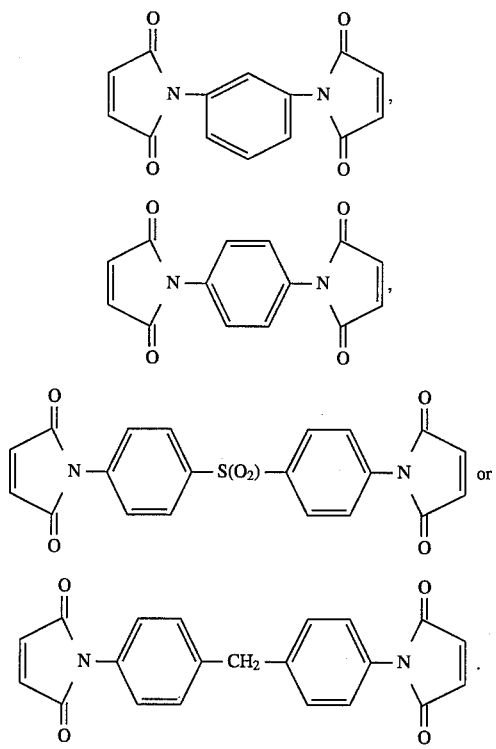

Sterically hindered hydroxyphenyl-alkyl-phosphonic acid esters and half-esters are known, for example, from U.S. Pat. No. 4,778,840. They can be described by the following formula:

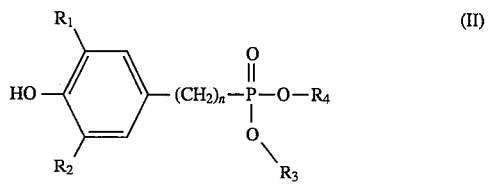

in which

R$_1$ is iso-propyl, tert-butyl, cyclohexyl or cyclohexyl which is substituted by 1–3 C$_1$–C$_{14}$alkyl groups;

R$_2$ is H, C$_1$–C$_4$alkyl, cyclohexyl or cyclohexyl which is substituted by 1–3 C$_1$–C$_4$alkyl groups;

R$_3$ is C$_1$–C$_{20}$alkyl or phenyl or naphthyl which is substituted or unsubstituted;

R$_4$ is H, M$^{2+}$/2, C$_1$–C$_{20}$alkyl or substituted or unsubstituted phenyl or naphthyl;

M$^{2+}$ is a divalent metal cation and n is 1–6.

Alkyl substituents having up to 8 carbon atoms are the radicals such as methyl, ethyl, propyl, butyl, pentyl, hexyl, octyl, stearyl or lauryl and corresponding branched isomers, C$_2$–C$_4$alkyl being preferred.

Substituents for the phenyl or naphthyl radicals are, for example, C$_1$–C$_4$alkyl groups.

Divalent metal cations are, for example, Zn, Ba, Ca and Mg. Ca is particularly preferred.

Preferred compounds of the formula (II) are those which contain at least one tert-butyl group as the radical R$_1$ or R$_2$. Especially preferred compounds are those in which R$_1$ and R$_2$ are tert-butyl (in the formulae:

).

n is preferably 1 or 2 and especially preferably 1.

Especially preferred sterically hindered hydroxyphenyl-alkyl-phosphonic acid esters and half-esters are

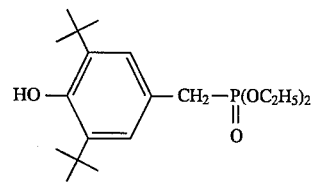

and

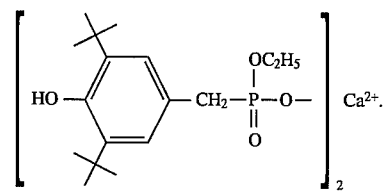

If appropriate, a mixture of different bismaleimides and/or different sterically hindered hydroxyphenyl-alkyl-phosphonic acid esters or half-esters can be employed.

The process can be carded out in any vessels which can be heated and are fitted with a stirring device, and these can be, for example, closed apparatuses excluding atmospheric oxygen, for example under an inert gas atmosphere (N$_2$). The process is preferably carried out in an extruder.

The polyamide material to be heated and the mixture of BMI and hydroxyphenyl-alkyl-phosphonic acid ester or half-ester are usually introduced into the apparatus at the start of heating, but subsequent metering of the BMI/hydroxyphenyl-alkyl-phosphonic acid ester or half-ester mixture into the polyamide is also possible, it being possible for the mixture to be added as such or for the individual components to be added in any sequence. Heating above the melting point or glass transition point is in general carried out while stirring, until the BMI/hydroxyphenyl-alkyl-phosphonic acid ester or half-ester mixture is homogeneously distributed. The temperature here depends on the polyamide used. In the case of crystalline polyamides, the process is preferably carried out in the range between the melting point and a temperature about 50° C. above the melting point. In the case of amorphous polyamides, the process is carried out, for example, in the range between 50° C. and 150° C. above the particular glass transition temperature.

For the addition, the BMI and the hydroxyphenyl-alkyl-phosphonic acid ester or half-ester can independently of one another be in the form of a liquid, a powder or granules or in compacted form, or can also be on a carrier material, such as silica gel, or in a form together with a polymer powder or wax, such as a polyethylene wax.

0.05 to 10 parts of a bismaleimide and 0.01 to 5 parts of a hydroxyphenyl-alkyl-phosphonic acid ester or half-ester are preferably added to 100 parts of polyamide. 0.1 to 5 parts of bismaleimide and 0.05 to 2 parts of hydroxyphenyl-alkyl-phosphonic acid ester or half-ester are particularly preferably employed here. 0.1 to 1 part of bismaleimide and 0.05 to 0.5 part of hydroxyphenyl-alkyl-phosphonic acid ester or half-ester are especially preferably employed. The amount of bismaleimide and hydroxyphenyl-alkyl-phosphonic acid ester or half-ester here depends on the starting molecular weight of the polymer and on the final molecular weight desired. Thus, in the case of a severely damaged polyamide, i.e. of low molecular weight, the bismaleimide and hydroxyphenyl-alkyl-phosphonic acid ester or half-ester will preferably be employed in the upper weight range. On the other hand, if only a small increase in molecular weight or only stabilization of processing is desired, a bismaleimide and a hydroxyphenyl-alkyl-phosphonic acid ester or half-ester will preferably be employed in a low concentration.

In addition to the mixture of a bismaleimide and a hydroxyphenyl-alkyl-phosphonic acid ester or half-ester, stabilizers can be added to the polyamide. These stabilizers are generally known to the expert and are chosen according to the specific requirement of the end product. In particular, light stabilizers or also antioxidants can be added ("Plastics Additives Handbook", Ed. R. Gächter and H. Müller, Hanser Verlag, 3rd edition, 1990; in particular pages 82/86 and 255/258).

Particularly suitable stabilizers are:

a) Antioxidants such as the esters of β-(3,5-di-tert-butyl-4-hydroxyphenyl)propionic acid and of β-(5-tert-butyl-4-hydroxy-3-methylphenyl)propionic acid with mono- or polyhydric alcohols, for example with methanol, octadecanol, 1,6-hexanediol, neopentylglycol, thiodiethylene glycol, diethylene glycol, triethylene glycol, pentaerythritol, tris(hydroxyethyl) iso-cyanurate, and N,N'-bis(hydroxyethyl)oxalic acid diamide, and the amides of these acids, for example, N,N'-bis(3,5-di-tert-butyl-4-hydroxyphenylpropionyl)hexamethylenediamine, N,N'-bis(3,5-di-tert-butyl-4-hydroxyphenylpropionyl)trimethylenediamine and N,N'-bis(3,5-di-tert-butyl-4-hydroxyphenylpropionyl)hydrazine or else tocopherol compounds.

Preferred antioxidants are those of the Irganox® 1098 and Irganox® 245 type, preferably in combination with aromatic phosphites or phosphonites. Examples of such phosphites or phosphonites are triphenyl phosphite, diphenyl alkyl phosphites, phenyl dialkyl phosphites, tris(nonylphenyl)phosphite, trilauryl phosphite, trioctadecyl phosphite, distearylpentaerythritol diphosphite, tris(2,4-di-tert-butylphenyl)phosphite, bis(2,4-di-tert-butylphenyl)pentaerythritol diphosphite, tristearyl-sorbitol triphosphite, tetrakis(2,4-di-tert-butylphenyl)-4,4'-biphenylene diphosphonite, 3,9-bis(2,4-di-tert-butyl-4-methylphenoxy)-2,4,8,10-tetraoxa-3,9-diphosphaspiro[5.5]undecane, 3,9-tris(2,4,6-tris-tert-butylphenoxy)-2,4,8,10-tetraoxa-3,9-diphosphaspiro[5.5]undecane and 2,2'-ethylidene-bis(4,6-di-tert-butylphenyl) fluorophosphite. Irgafos® 168 is particularly preferred.

b) Light stabilizers, such as 1. 2-(2'-hydroxyphenyl)-benzotriazoles, for example 2-(2'-hydroxy-5'-methylphenyl)benzotriazole, 2-(3',5'-di-tert-butyl-2'-hydroxyphenyl)-benzotriazole, 2-(5'-tert-butyl-2'-hydroxyphenyl)-benzotriazole, 2-(2'-hydroxy-5'-(1,1,3,3-tetramethylbutyl)phenyl)-benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)-benzotriazole, 2-(2'-hydroxy-4'-octoxyphenyl)-benzotriazole, 2-(3',5'-di-tert-amyl-2'-hydroxyphenyl)-benzotriazole, 2-(3',5'-bis(α,α -dimethylbenzyl)-2'-hydroxyphenyl)-benzotriazole, mixture of 2-(3'-tert-butyl-2'-hydroxy-5'-(2-octyloxycarbonylethyl)phenyl)-5-chloro-benzotriazole, 2-(3'-tert-butyl-5'-[ 2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)-benzotriazole, 2-(3'-tert-butyl-2'-hydroxy-5'-(2-octyloxycarbonylethyl)phenyl)-benzotriazole, 2-(3'-tert-butyl-5'-[2-(2-ethylhexyloxy)carbonylethyl]-2'-hydroxyphenyl)-benzotriazole, 2-(3'-dodecyl-2'-hydroxy-5'-methylphenyl)-benzotriazole, and 2-(3'-tert-butyl-2'-hydroxy-5'-(2-isooctyloxycarbonylethyl)phenyl-benzotriazole, and 2,2'-methylene-bis[4 -(1,1,3,3-tetramethylbutyl)-6-benzotriazol-2-yl-phenol]; the transesterification product of 2-[3'-tert-butyl-5'-(2-methoxycarbonylethyl)-2'-hydroxy-phenyl]-benzotriazole with polyethyleneglycol 300; and $[R-CH_2CH_2-COO(CH_2)_3]_2$, where R=3'-tert-butyl- 4'-hydroxy-5'-2H-benzotriazol-2-yl-phenyl.

2. 2-hydroxybenzophenones, for example the 4-hydroxy, 4-methoxy, 4-octoxy, 4-decyloxy, 4-dodecyloxy, 4-benzyloxy, 4,2',4'-trihydroxy and 2'-hydroxy-4,4'-dimethoxy derivative.

3. esters of substituted or unsubstituted benzoic acids, for example 4-tert-butyl-phenylsalicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl- 4-hydroxybenzoate, 2-methyl-4,6-di-tert-butylphenyl 3,5-di-tert-butyl-4-hydroxy benzoate.

4. acrylates, for example ethyl or isooctyl α-cyano-β,β-diphenylacrylate, methyl α-carbo-methoxy-cinnamate, methyl or butyl α-cyano-β-methyl-p-methoxy-cinnamate, methyl α-carbomethoxy-p-methoxy-cinnamate and N-(β-carbomethoxy-β -cyanovinyl)-2-methylindoline.

b 5. nickel compounds, for example nickel complexes of 2,2'-thio-bis[4-(1,1,3,3-tetramethylbutyl)phenol], such as the 1:1- or 1:2 complex, if appropriate with additional ligands, such as n-butylamine, triethanolamine or N-cyclohexyl-diethanolamine, nickel dibutyldithiocarbamate, nickel salts of 4-hydroxy-3,5-di-tert-butylbenzylphosphonic acid monoalkyl esters, such as of the methyl or ethyl ester, nickel complexes of ketoximes, such as of 2-hydroxy-4-methyl-phenyl-undecylketoxime, and nickel complexes of 1-phenyl-4-lauroyl-5-hydroxypyrazole, if appropriate with additional ligands.

6. sterically hindered amines, for example bis(2,2,6,6-tetramethyl-pipefidyl) sebacate, bis(2,2,6,6-tetramethyl-pipefidyl) succinate, bis(1,2,2,6,6-pentamethylpipefidyl) sebacate, bis(1,2,2,6,6-pentamethylpiperidyl) n-butyl-3, 5-di-tert-butyl-4-hydroxybenzyl-malonate, the condensation product of 1-hydroxyethyl-2,2,6,6-tetramethyl-4-hydroxypiperidine and succinic acid, the condensation product of N,N'-bis(2,2,6,6-tetramethyl-4-piperidyl)hexamethylenediamine and 4-tert-octylamino-2,6-dichloro-1, 3,5-s-triazine, tris(2,2,6,6-tetramethyl-4-piperidyl) nitrilotriacetate, tetrakis(2,2,6,6-tetramethyl-4-piperidyl) 1,2,3,4-butanetetraoate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl) 2-n-butyl-2-(2-hydroxy-3,5-di-tert-butylbenzyl)malonate, 3-n-octyl-7,7,9, 9-tetramethyl-1,3,8-triazaspiro[4.5]decane-2,4-dione, bis(1-octyloxy-2,2,6,6-tetramethylpiperidyl) sebacate, bis(1-octyloxy-2,2,6,6-tetramethylpiperidyl) succinate, the condensation product of N,N'-bis(2,2,6,6-tetramethyl-4-piperidyl)hexamethylenediamine and 4-morpholino-2, 6-dichloro-1,3,5-triazine, the condensation product of 2-chloro-4,6-di-(4-n-butylamino-2,2,6,6-tetramethylpiperidyl)- 1,3,5-triazine and 1,2-bis(3-aminopropylamino)ethane, the condensation product of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[ 4.5]decane-2,4-dione, 3-dodecyl-1-(2,2,6,6-tetramethyl-4-piperidyl)pyrrolidine- 2,5-dione, and 3-dodecyl-1-(1,2, 2,6,6-pentamethyl-4-piperidyl)pyrrolidine- 2,5-dione.

7. oxalic acid diamides, for example 4,4'-di-octyloxy-oxanilide, 2,2'-di-ethoxy-oxanilide, 2,2'-di-octyloxy-5,5'-di-tert-butyl-oxanilide, 2,2'-di-dodecyloxy-5,5'di-tert-butyl-oxanilide, 2-ethoxy-2'-ethyl-oxanilide, N,N' -bis(3-dimethylaminopropyl)oxalamide, 2-ethoxy-5-tert-butyl-2'-ethyloxanilide and a mixture thereof with 2-ethoxy-2'-ethyl-5,4'-di-tert-butyl-oxanilide, and mixtures of o- and p-methoxy- and of o- and p-ethoxy-di-substituted oxanilides.

8. 2-(2-hydroxyphenyl)-1,2,3,5-triazines, for example 2,4,6-tris(2-hydroxy-4-octyloxyphenyl)- 1,3,5-triazine, 2-(2-hydroxy-4-octyloxyphenyl)-4,6-bis(2,4-dimethylphenyl)- 1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3, 5-triazine, 2-(2-hydroxy-4-dodecyloxyphenyl)-4,6-bis(2, 4-dimethylphenyl)-1,3,5-triazine, 2-[2-hydroxy-4-(2-hydroxy-3-butyloxy-propyloxy)phenyl]-4,6-bis(2,4-dimethylphenyl)- 1,3,5-triazine, and 2-[2-hydroxy-4-(2-hydroxy-3-octyloxypropyloxy)phenyl]-4,6-bis( 2,4-dimethylphenyl)-1,3,5-triazine.

Preferred light stabilizers are those of classes 1, 6 and 7, for example light stabilizers of the Chimassorb® 944, Chimassorb® 119, Tinuvin® 234, Tinuvin® 312 or Tinuvin® 770 type.

It is also possible to add other additives, for example lubricants, mould release agents, flameproofing agents, antistatics, fillers or reinforcing substances, for example glass fibres.

If the polyamide is a recycled material, it can also be employed as a mixture with newly produced material or together with newly produced material, for example in a coextrusion process.

The invention furthermore relates to the use of a mixture comprising a bismaleimide and a hydroxyphenyl-alkylphosphonic acid ester or half-ester for increasing the molecular weight of newly produced polyamide or polyamide recycled materials. The preferred conditions for the use correspond to those for the process.

The invention furthermore relates to mixtures comprising a polyamide, a bismaleimide and a hydroxyphenyl-alkylphosphonic acid ester or half-ester. The preferred ranges for the mixtures correspond to those for the process.

EXAMPLES

The following examples illustrate the invention in more detail, without limiting it thereto. As in the remainder of the description, parts and percentages are by weight, unless stated otherwise.

Examples 1–6

A polyamide 6 (Durethan® B30 S from Bayer) is kneaded in a Plasticorder from Brabender with mixing chamber W 50 under nitrogen at a temperature of 232° C. for a period of 30 minutes and the torque is determined. Thereafter, the reduced viscosity and the melt volume rate are measured. The reduced viscosity is determined by measurement of a solution of 0.25 g of the polymer in 100 g of o-dichlorobenzene/phenol (1:1) at 30° C. The values shown in Table 1 are obtained.

The following compounds are used:
BMI-1: 4,4'-Diphenylmethanebismaleimide

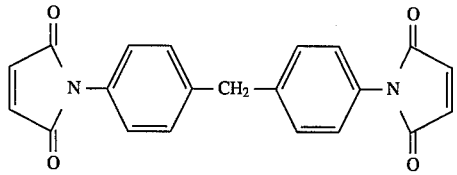

The sterically hindered phenols are:

TABLE 1

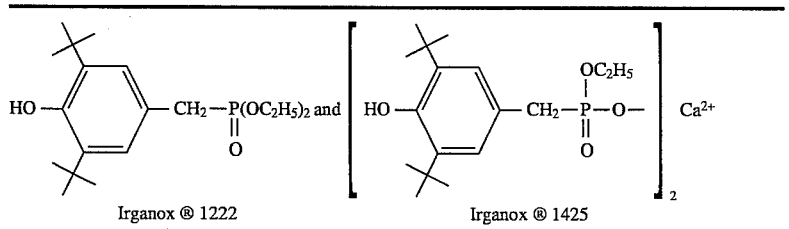

Irganox ® 1222      Irganox ® 1425

Increase in the molecular weight of polyamide 6

| Parts of hindered phenol per 100 parts of PA 6 | | Parts of bismaleimide per 100 parts of PA6 | | Torque after 30 minutes (Nm) | Reduced viscosity (dl/g) | Melt volume rate 225/2.16 cm³/10 min |
|---|---|---|---|---|---|---|
| Exp. | | | | | | |
| 1 | 0.5 Irganox 1425 | 0.5 | BMI-1 | 9.5 | 2.84 | 5.5 |
| 2 | 0.25 Irganox 1425 | 0.5 | BMI-1 | 9.9 | 2.72 | 6.6 |
| 3 | 0.5 Irganox 1222 | 0.5 | BMI-1 | 12.9 | 3.28 | 4.5 |
| 4 | 0.25 Irganox 1222 | 0.5 | BMI-1 | 10.0 | — | 6.5 |
| 5 | 0.25 Irganox 1425 | 0.25 | BMI-1 | 7.7 | — | — |
| 6 | 0.25 Irganox 1222 | 0.25 | BMI-1 | 8.1 | — | — |
| V1 | 1 Irganox 1425 | — | — | 5.8 | 1.84 | 13.1 |
| V2 | — | 1 | BMI-1 | 7.5 | 2.40 | 8.2 |

The increase in the torque and reduced viscosity and the decrease in the melt volume rate (determined analogously to ISO 1133) demonstrate a significant increase in the molecular weight of the samples of Examples 1–6 treated according to the invention.

Examples 7 and 8

A polyamide 6 (Durethan B 30 S, melt volume rate=30, predried at 100° C.) is processed with the additives shown in Table 2 in a twin-screw extruder (Haake Rheocord 90) at 230° C. and 25 revolutions per minute. The decrease in the melt volume rate (determined analogously to ISO 1133) demonstrates the increase in molecular weight of the polymers prepared by the process according to the invention.

TABLE 2

Increase in the molecular weight of polyamide 6

| | Parts of hindered phenol per 100 parts of PA 6 | Parts of bismaleimide per 100 parts of PA 6 | Melt volume rate 235/2.16 cm³/10 minutes |
|---|---|---|---|
| Exp. V3 | — | — | 29.3 |
| V4 | 0.25 Irganox 1425 | — | 30 |
| V5 | 0.25 Irganox 1222 | — | 31.7 |
| V6 | — | 0.5 BMI-1 | 26.1 |
| 7 | 0.25 Irganox 1425 | 0.5 BMI-1 | 13.6 |
| 8 | 0.25 Irganox 1222 | 0.5 BMI-1 | 17.8 |

Example 9

Polyamide 6 production waste (from production of coated wheel shields, glass fibre content about 25%) is processed with the additives shown in Table 3 in a twin-screw extruder (Haake Rheocord 90) at 230° C. and 35 revolutions per minute. The decrease in the melt volume rate (determined analogously to ISO 1133) and the increase in the reduced viscosity demonstrate the increase in the molecular weight of the recycled material treated by the process according to the invention.

TABLE 3

Increase in the molecular weight of polyamide (production waste)

| | Parts of hindered phenol per 100 parts of PA 6 | Parts of bismaleimide per 100 parts of PA 6 | Reduced viscosity* (dl/g) | Melt volume rate cm³/10 min |
|---|---|---|---|---|
| Exp. V7 | — | — | 1.04 | 9.0 |
| 9 | 0.25 Irganox 1225 | 0.5 BMI-1 | 1.24 | 3.9 |

*not corrected for the glass fibre content

What is claimed is:

1. A process for increasing the molecular weight of polyamides, which comprises heating a polyamide, with addition of a bismaleimide and a sterically hindered hydroxyphenyl-$C_1$–$C_6$alkyl-phosphonic acid ester or half-ester, above the melting point or glass transition point of the polyamide.

2. The process according to claim 1, wherein a polyamide recycled material is used as the polyamide.

3. The process according to claim 1, wherein the bismaleimide is a compound of the formula (I)

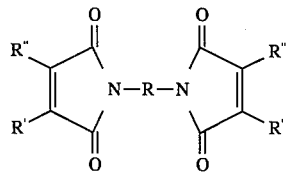

(I)

in which

R is an aliphatic, aromatic, cycloaliphatic or heterocyclic radical; and

R' and R" independently of one another are hydrogen, $C_1$–$C_4$alkyl, $C_1$–$C_6$alkoxy, phenyl or phenyloxy.

4. The process according to claim 1, wherein the bismaleimide is a compound of the formula (I)

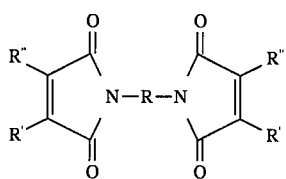

in which
R is an aromatic radical of one of the formulae:

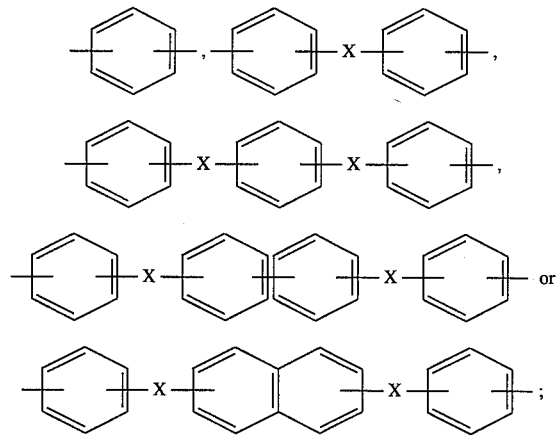

in which
X is one of the radicals —CH$_2$—, —C(O)—, —P(O)(C$_1$-C$_{18}$alkyl)—, —S(O$_2$)—, —O— or —S—; and
R' and R" independently of one another are hydrogen, C$_1$-C$_4$alkyl, C$_1$-C$_6$alkoxy, phenyl or phenyloxy.

5. The process according to claim 3, wherein the radicals R' and R" in formula (I) are hydrogen.

6. The process according to claim 1, wherein the sterically hindered hydroxyphenyl-C$_1$-C$_6$alkyl-phosphonic acid ester or half-ester has the formula

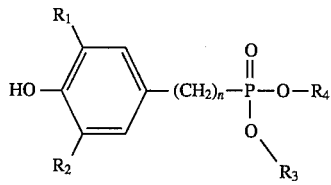

in which

R$_1$ is iso-propyl, tert-butyl, cyclohexyl or cyclohexyl which is substituted by 1–3 C$_1$-C$_4$alkyl groups;

R$_2$ is H, C$_1$-C$_4$alkyl, cyclohexyl or cyclohexyl which is substituted by 1–3 C$_1$-C$_4$alkyl groups;

R$_3$ is C$_1$-C$_{20}$alkyl or phenyl or naphthyl which phenyl or naphthyl is unsubstituted or substituted by one or more C$_1$-C$_4$ groups;

R$_4$ is H, M$^{2+}$/2, C$_1$-C$_{20}$alkyl or phenyl or naphthyl which phenyl or naphthyl is unsubstituted or substituted by one or more C$_1$-C$_4$ groups;

M$^{2+}$ is a divalent metal cation and n is 1–6.

7. The process according to claim 1, wherein the sterically hindered hydroxyphenyl-C$_1$-C$_6$alkyl-phosphonic acid ester or half-ester is a compound of the formula $$HO-\underset{}{\underset{}{\bigcirc}}-CH_2-\underset{\underset{O}{\|}}{P}(OC_2H_5)_2$$

or $$\left[HO-\underset{}{\underset{}{\bigcirc}}-CH_2-\underset{\underset{O}{\|}}{\overset{OC_2H_5}{P}}-O-\right]_2 Ca^{2+}$$

8. The process according to claim 1, wherein 0.05 to 10 parts of the bismaleimide and 0.01 to 5 parts of the sterically hindered hydroxyphenyl-C$_1$-C$_6$alkyl-phosphonic acid ester or half-ester are used per 100 parts of polyamide.

9. The process according to claim 1, wherein polyamide 6 or polyamide 6.6 or a mixture thereof is employed as the polyamide.

* * * * *